(12) United States Patent
Kunito

(10) Patent No.: US 11,889,204 B2
(45) Date of Patent: Jan. 30, 2024

(54) IMAGING DEVICE, IMAGE DATA PROCESSING METHOD, AND PROGRAM

(71) Applicant: Sony Group Corporation, Tokyo (JP)

(72) Inventor: Yoshiyuki Kunito, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/636,965

(22) PCT Filed: Jun. 21, 2020

(86) PCT No.: PCT/JP2020/024271
§ 371 (c)(1),
(2) Date: Feb. 21, 2022

(87) PCT Pub. No.: WO2021/039055
PCT Pub. Date: Mar. 4, 2021

(65) Prior Publication Data
US 2022/0279120 A1     Sep. 1, 2022

(30) Foreign Application Priority Data

Aug. 30, 2019   (JP) .................................. 2019-158052

(51) Int. Cl.
*H04N 23/951*     (2023.01)
*H04N 23/661*     (2023.01)

(52) U.S. Cl.
CPC ......... *H04N 23/951* (2023.01); *H04N 23/661* (2023.01)

(58) Field of Classification Search
CPC ...... H04N 23/951; H04N 23/661; H04N 1/56; H04N 2201/3205; H04N 2201/3233; H04N 1/00167; H04N 23/60; H04N 23/69; H04N 1/32128; G06F 21/64; H04L 9/3236; H04L 9/3247
USPC ....................................................... 348/222.1
See application file for complete search history.

(56) References Cited

U.S. PATENT DOCUMENTS

| | | | |
|---|---|---|---|
| 5,499,294 A | 3/1996 | Friedman | |
| 2004/0107348 A1 | 6/2004 | Iwamura | |
| 2004/0215960 A1 | 10/2004 | Wakao | |

FOREIGN PATENT DOCUMENTS

| | | | |
|---|---|---|---|
| JP | 2003298579 A | 10/2003 | |
| JP | 2005341395 A | 12/2005 | |
| JP | 2007080071 A | 3/2007 | |
| JP | 2008124668 A | 5/2008 | |

OTHER PUBLICATIONS

International Search Report (PCT/ISA/210), International Application No. PCT/JP2020/024271, dated Aug. 18, 2020.

*Primary Examiner* — Stephen P Coleman
(74) *Attorney, Agent, or Firm* — Michael Best & Friedrich LLP

(57) ABSTRACT

An object is to make it possible to add an electronic signature to an edited image under reliable environment. An imaging device includes a determination processing unit that executes determination processing for determining whether or not image data is an own device captured image captured by an own device on the basis of metadata corresponding to the image data input from outside of the own device and a signature processing unit that acquires re-signature data different from signature data at the time of imaging using the image data and metadata for the image data determined as an own device captured image by the determination processing unit.

20 Claims, 11 Drawing Sheets

IMAGING DEVICE, IMAGE DATA PROCESSING METHOD, AND PROGRAM

TECHNICAL FIELD

The present technology relates to an imaging device, an image data processing method, and a program, and more particularly, to a technology regarding an electronic signature of image data.

BACKGROUND ART

A technique regarding authentication of image data by adding an electronic signature to the captured image data has been known.

Patent Document 1 describes a technique, when a device transmits image data to which an electronic signature is added to another device via a network or the like and the another device receives the image data, authenticating the device that has captured the received image data on the basis of the electronic signature.

CITATION LIST

Patent Document

Patent Document 1: Japanese Patent Application Laid-Open No. 2005-341395

SUMMARY OF THE INVENTION

Problems to be Solved by the Invention

Recently, an imaging person has actively posted an image captured by the imaging person with an imaging device such as a digital still camera or a smartphone on a posting site, a social networking service (SNS), or the like.

Under such an environment, cases are occasionally seen where another person copies the captured image of the imaging person and the another person posts the image that is copied as if the another person has captured the image. Therefore, in order to prove that the image is an image captured by an imaging device owned by the imaging person, an electronic signature is added to an image captured by an own device as metadata.

Meanwhile, the captured image is often edited by the imaging person in order to improve appearance for viewing. However, in this case, the electronic signature added to the captured image to recognize falsification of the captured image by a third party becomes invalid.

Therefore, it is desirable to add an electronic signature to the edited image again so that the falsification of the captured image can be recognized for the edited image.

Therefore, the present disclosure proposes a technology that enables to add an electronic signature to an edited image under a reliable environment.

Solutions to Problems

An imaging device according to the present technology includes a determination processing unit that executes determination processing for determining whether or not image data is an own device captured image captured by an own device on the basis of metadata corresponding to the image input from outside of the own device and a signature processing unit that acquires re-signature data different from signature data at the time of imaging using image data and metadata for the image data determined as an own device captured image by the determination processing unit.

As a result, the imaging device that has captured the image data can update signature data for the captured image data.

Here, the own device indicates an imaging device that captures the image data. Furthermore, the image data input from outside the own device indicates image data acquired from a device other than the imaging device, which is the own device, such as various devices, terminal devices, recording media, or other imaging devices.

It is considered that, in the imaging device according to the present technology described above, the signature processing unit acquires the image data captured by the own device and the signature data using the metadata corresponding to the image data.

As a result, for example, at a timing when the imaging device 1 performs imaging, the imaging device 1 can acquire the captured image data and signature data 33 using the metadata corresponding to the image data.

It is considered, in the imaging device according to the present technology described above, the signature processing unit generates the re-signature data using the image data and the metadata for the image data determined as an own device captured image by the determination processing unit.

As a result, the imaging device that has captured the image data, not the other external device, generates the re-signature data.

It is considered that, in the imaging device according to the present technology described above, the determination processing unit executes the determination processing on image data, input from outside of the own device, in which an edition parameter related to edition processing by an external device is included in metadata.

Because the edition parameter added from the external device is included in the metadata added to the image data, it is necessary to newly acquire the re-signature data.

It is considered that, in the imaging device according to the present technology described above, in a case where the image data determined as an own device captured image by the determination processing unit is image data that is not edited by the external device and the edition parameter related to the edition processing by the external device is added as metadata, the signature processing unit acquires the image data determined as an own device captured image and the re-signature data using metadata.

That is, it is possible to acquire the image data that is not edited by the external device and the re-signature data using the metadata.

It is considered that, in the imaging device according to the present technology described above, the signature processing unit acquires the image data determined as an own device captured image and the re-signature data using metadata including the edition parameter.

That is, it is possible to acquire the image data that is not edited by the external device and the re-signature data using the edition parameter.

It is considered that the imaging device according to the present technology described above includes an integration processing unit that integrates the re-signature data acquired by the signature processing unit with the image data determined as an own device captured image and the metadata including the edition parameter.

As a result, an image file is generated in which the re-signature data, the image data determined as the own device captured image, and the metadata including the edition parameter are integrated.

It is considered that the imaging device according to the present technology described above includes an image processing unit that generates edited image data by executing image processing on the image data using the edition parameter in a case where the image data determined as an own device captured image in the determination processing is image data that is not edited by the external device and the edition parameter related to the edition processing by the external device is added as metadata.

That is, the image processing is executed on the image data of the own device captured image in the imaging device on the basis of the edition parameter related to the edition processing by the external device.

It is considered that, in the imaging device according to the present technology described above, the signature processing unit acquires the edited image data and the re-signature data using the metadata.

That is, it is possible to acquire the edited image data and the re-signature data using the metadata corresponding to the edited image data.

In the imaging device according to the present technology described above, the signature processing unit acquires the edited image data and the re-signature data using the metadata including the edition parameter.

That is, it is possible to acquire the edited image data and the re-signature data using the edition parameter corresponding to the edited image data.

It is considered that the imaging device according to the present technology described above includes an integration processing unit that integrates the re-signature data acquired by the signature processing unit with the edited image data and the metadata.

As a result, an image file is acquired in which the re-signature data that is metadata, the edited image data, and other metadata added to the edited image data are integrated.

It is considered, in the imaging device according to the present technology described above, the integration processing unit integrates the re-signature data acquired by the signature processing unit with the edited image data and the metadata including the edition parameter.

As a result, an image file is acquired in which the re-signature data, the edited image data, and the metadata including the edition parameter are integrated.

It is considered that, in the imaging device according to the present technology described above, the determination processing unit executes the determination processing using information regarding the own device included in metadata.

For example, the determination processing is executed for determining whether or not the metadata corresponding to the image data input from outside of the own device includes the information regarding the own device.

It is considered that, in the imaging device according to the present technology described above, the signature processing unit calculates a hash value using the image data input from outside of the own device and the metadata corresponding to the image data and generates the re-signature data using the calculated hash value.

As a result, for example, even if the image data is the same as the edited image data in the image file, in a case where the edition parameters are different, different hash values are calculated.

It is considered that, in the imaging device according to the present technology described above, the signature processing unit generates the signature data using the image data captured by the own device and the metadata corresponding to the image data.

That is, it is possible to acquire the signature data using the image data captured by the imaging device and the metadata corresponding to the image data.

It is considered that, in the imaging device according to the present technology described above, the signature processing unit calculates a hash value using the image data captured by the own device and the metadata corresponding to the image data and generates the signature data using the calculated hash value.

As a result, even if the image data is the same as the image data in the image file at the time of imaging, for example, in a case where parameters at the time of imaging are different, different hash values are different.

It is considered that, in the imaging device according to the present technology described above, the re-signature data is generated using the hash value and a secret key in a public key encryption system.

In a case where a user who has captured the image data has encrypted and transmitted the re-signature data using the secret key in the public key encryption system, if a third party who receives the re-signature data can decrypt the re-signature data with a public key corresponding to (paired) secret key, the receiver side can verify the transmission by the user who has captured the image data.

It is considered that the imaging device according to the present technology described above includes a communication unit that outputs file data in which the re-signature data, the edited image data, and metadata are integrated.

As a result, the file data in which the re-signature data and the metadata to which the edited image data is set are integrated can be transmitted to a device that verifies authenticity of the own device captured image.

An image data processing method according to the present technology performed by an imaging device includes executing determination processing for determining whether or not image data is an own device captured image captured by an own device on the basis of metadata corresponding to the image data input from outside of the own device and acquiring re-signature data different from signature data at the time of imaging using the image data and metadata for the image data determined as an own device captured image in the determination processing.

A program according to the present technology is a program that causes an imaging device to execute each processing corresponding to the image data processing method described above.

MODE FOR CARRYING OUT THE INVENTION

Figure 1:
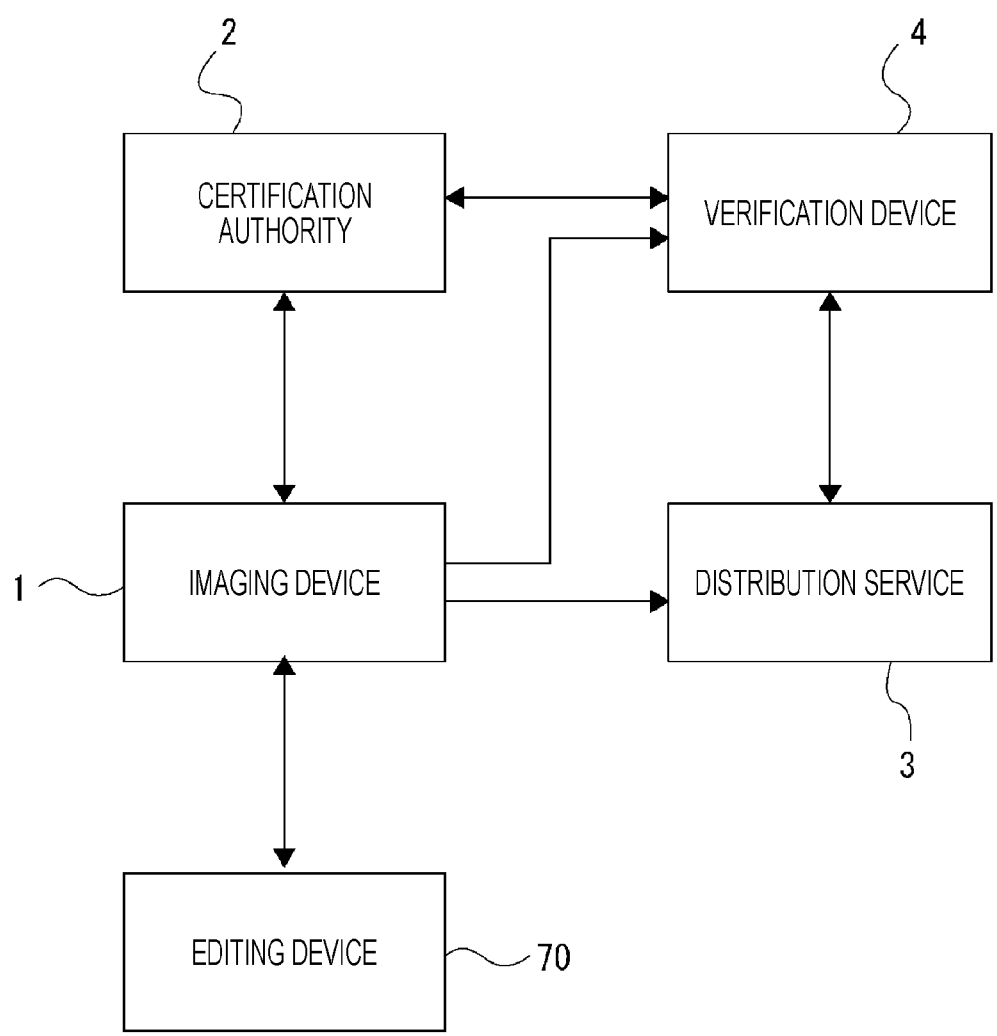
FIG. 1 is an explanatory diagram of a verification system according to an embodiment of the present technology.

Hereinafter, an embodiment will be described in the following order.

<1. Outline of Verification System>
<2. Configuration of Device That Is Applicable As Imaging Control Device>
<3. Configuration of Imaging Device>
<4. Configuration of Editing Device>
<5. Structure of Image File>
<6. Processing for Realizing Embodiment>
<7. Summary>

Note that content and structures described once are denoted with the same reference numerals below, and it is assumed that description be omitted.

<1. Outline of Verification System>

The present technology relates to, for example, an electronic signature added to image data in a verification system that verifies that image data is not a copy or falsification of an image captured by another user and is captured or edited by a user (hereinafter, also described as image is authentic).

First, an example of a verification system according to an embodiment will be described with reference to FIG. 1.

In this verification system, for example, an imaging device 1, a certification authority 2, a distribution service 3, a verification device 4 of a verification service, and an editing device 70 appear.

The imaging device 1 is used by a user and can edit an image on the basis of an edition parameter acquired from the editing device 70 that is an external device.

The external device includes various devices other than the imaging device 1, and, for example, a stationary computer device, a terminal device such as a smartphone or a tablet terminal, and the like are assumed.

The certification authority 2 is an organization that issues a user identification module (UIM) used to certify that the user has captured and edited an image captured with the imaging device 1 by the user and an edited image of the image.

The user accesses a website of the certification authority 2, inputs information such as a name, a company name, an address, an occupation, or the like as personal identification information, and pays a fee such as annual usage charge so as to make the certification authority 2 issue the UIM. The UIM is issued as an external terminal such as a universal serial bus (USB). In the UIM, a key pair of public keys corresponding to secret keys in a public key encryption system is recorded, and a public key certificate for the information such as the user's name, that is, user identification information is recorded.

By acquiring the secret key used for encryption from the UIM issued by the certification authority 2 by the imaging device 1 of the user or connecting the UIM to the imaging device 1, an electronic signature is performed on the image captured by the imaging device 1 or the image data of the edited image edited by the editing device 70.

The distribution service 3 is, for example, a providing service such as an image posting site or an SNS, and various images can be posted. The user releases image data captured by the imaging device 1 and edited image data of the image data via the distribution service 3.

In the verification service, the verification device 4 determines whether or not the posted image is not a copied or falsified image and is captured by the user as creation, in response to a request from an operator or the like of the distribution service 3 and notifies the distribution service 3 of the result.

Furthermore, the verification device 4 of the verification service can determine whether or not an image to which an electronic signature is added by the UIM is registered by the user who has added an electronic signature to an image captured by the imaging image 1 and the image posted on the distribution service 3 on the basis of the registered image is authentic.

As described above, it is possible to realize this verification system by verifying whether or not the image distributed in the distribution service 3 is authentic by the verification device 4 of the verification service and acquiring the verification result by the distribution service 3.

<2. Configuration of Device That Is Applicable As Imaging Control Device>

Figure 2:
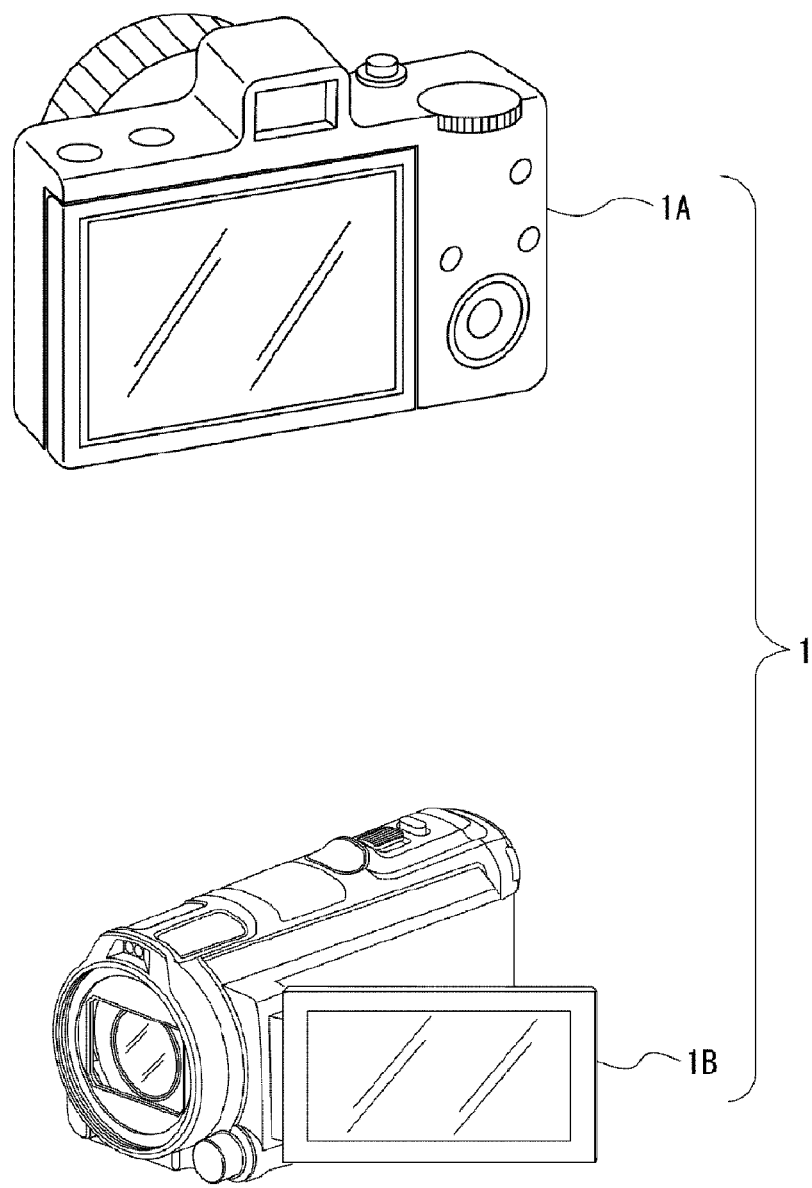
FIG. 2 is an explanatory diagram of a device used in the embodiment.

An example in which the imaging device 1 according to the present technology is realized will be described with reference to FIG. 2. The imaging device 1 is realized by various devices.

A device to which the present technology can be applied will be described. FIG. 2 illustrates an example of a device that may serve as the imaging device 1.

The device that may serve as the imaging device 1 is a device having an imaging function, and various devices can be considered. For example, as the imaging device 1, a digital still camera 1A, a digital video camera 1B, or the like is assumed. Furthermore, although not illustrated, a mobile terminal such as a smartphone that has the imaging function or the like may be the imaging device 1.

In the imaging device 1, a microcomputer or the like in the imaging device 1 executes various types of processing on image data. For example, the imaging device 1 can add signature data to the captured image data and add re-signature data to the edited image data.

As described above, although various devices function as the imaging device 1 according to the embodiment, an example in which the imaging device 1 is realized as the digital still camera 1A will be described below.

<3. Configuration of Imaging Device>

A configuration example of the imaging device 1 will be described with reference to FIG. 3.

Figure 3:
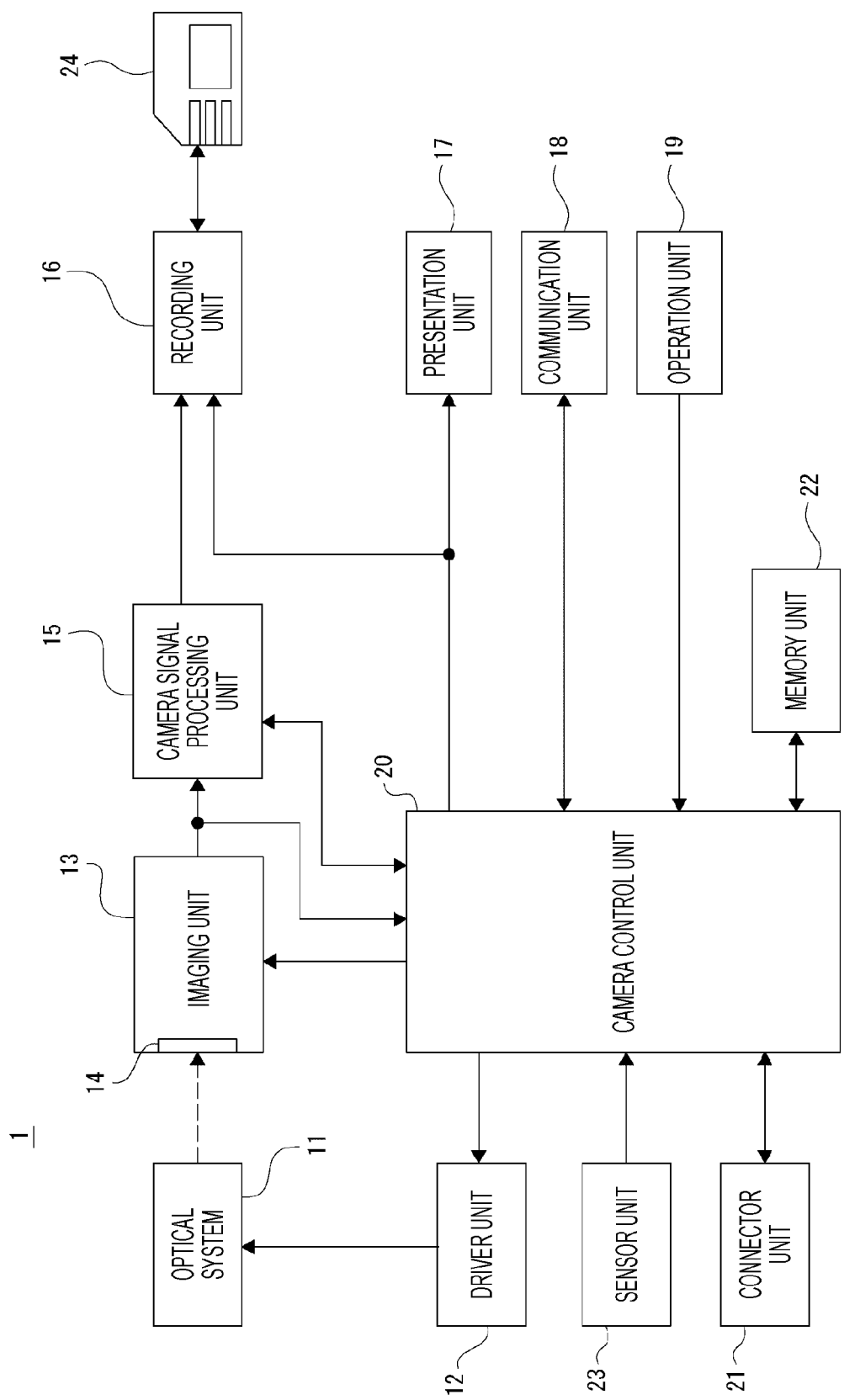
FIG. 3 is a block diagram of an imaging device according to the embodiment.

As illustrated in FIG. 3, the imaging device 1 includes an optical system 11, a driver unit 12, an imaging unit 13, a camera signal processing unit 15, a recording unit 16, a presentation unit 17, a communication unit 18, an operation unit 19, a camera control unit 20, a connector unit 21, a memory unit 22, and a sensor unit 23.

The optical system 11 includes lenses such as a zoom lens and a focus lens, a diaphragm mechanism, or the like. This optical system 11 guides light (incident light) from a subject and collects the light to the imaging unit 13.

In the driver unit 12, for example, a motor driver for a zoom lens driving motor, a motor driver for a focus lens driving motor, a motor driver for a diaphragm mechanism driving motor, a shutter driver for a shutter driving motor, or the like are provided.

The driver unit 12, for example, applies a driving current to a corresponding driver in response to an instruction from the camera control unit 20 and moves the focus lens and the zoom lens, opens and closes a diaphragm blade of a diaphragm mechanism, performs a shutter operation, or the like.

The diaphragm mechanism is driven by the diaphragm mechanism driving motor and controls an incident light amount to the imaging unit 13 to be described later. The focus lens is driven by the focus lens driving motor and used for focus adjustment. The zoom lens is driven by the zoom lens driving motor and used for zoom adjustment. The shutter mechanism is driven by the shutter driving motor, and the shutter operation is performed.

The imaging unit 13 includes, for example, an imaging sensor 14 (imaging element) of a type such as a complementary metal oxide semiconductor (CMOS) type or a charge coupled device (CCD) type. The imaging sensor 14 includes an imaging pixel used to capture an image of a subject or the like.

The imaging unit 13 executes, for example, correlated double sampling (CDS) processing, automatic gain control (AGC) processing, or the like on an electric signal obtained by photoelectrically converting light received by the imaging sensor 14 and further executes analog/digital (A/D) conversion processing. The imaging unit 13 outputs an imaging signal as digital data to the camera signal processing unit 15 and the camera control unit 20.

The imaging sensor 14 includes the plurality imaging pixels, and each imaging pixel accumulates a charge according to an intensity of the received light.

The imaging sensor 14 may be covered with, for example, a Bayer array color filter. An imaging signal can be read from an electric signal obtained by photoelectrically converting the light received by this imaging pixel group.

The imaging sensor 14 outputs the imaging signal to the camera signal processing unit 15 and the camera control unit 20.

The camera signal processing unit 15 is configured as, for example, an image processing processor with a digital signal processor (DSP) or the like.

The camera signal processing unit 15 executes various types of signal processing on a digital signal (captured image signal) from the imaging unit 13. For example, the camera signal processing unit 15 executes preprocessing, synchronization processing, YC generation processing, various types of correction processing, resolution conversion processing, or the like.

In the preprocessing, clamp processing for clamping black levels of R, G, and B to predetermined signal levels, correction processing between color channels including R, G, and B, and the like are executed on the captured image signal from the imaging unit 13.

In the synchronization processing, color separation processing is executed so that image data for each pixel includes all the R, G, and B color components. For example, in a case of the imaging element using the Bayer array color filter, demosaic processing is executed as the color separation processing.

In the YC generation processing, a luminance (Y) signal and a color (C) signal are generated (separated) from the R, G, and B image data.

In the resolution conversion processing, the resolution conversion processing is executed on image data before various types of signal processing is executed or on which the signal processing has been executed.

In codec processing by the camera signal processing unit 15, for example, encoding processing and file generation for recording and communication are performed on the image data on which various types of processing above is executed. For example, an image file in an MP4 format or the like used to record moving images and sound conforming to the MPEG-4 is generated. Furthermore, as a still image file, it is considered to generate a file in a format such as joint photographic experts group (JPEG), tagged image file format (TIFF), or graphics interchange format (GIF).

The recording unit 16 performs, for example, recording and reproduction on a removable recording medium 24 with a nonvolatile memory. For example, the recording unit 16 executes processing for recording image files such still image data or moving image data, thumbnail images, generated defocus map data, or the like on the removable recording medium 24.

Various embodiments of the recording unit 16 can be considered. For example, the recording unit 16 may be configured as a flash memory built in the imaging device 1 and a writing/reading circuit thereof, or may be in a form of a recording medium detachable from the imaging device 1, for example, a card recording and reproducing unit that performs recording and reproducing access on a memory card (portable flash memory or the like). Furthermore, the form built in the imaging device 1 may be realized as a hard disk drive (HDD) or the like.

The presentation unit 17 includes a display unit that performs various displays to an imaging person, and the display unit is, for example, a display panel including a display device such as a liquid crystal display (LCD) panel or an organic electro-luminescence (EL) display arranged in a housing of the imaging device 1 or a viewfinder.

Note that the presentation unit 17 may include an audio output unit such as a speaker. For example, the audio output unit can output a digital audio signal read from the camera control unit 20 and has been converted into an audio signal by the camera signal processing unit 15.

The display unit of the presentation unit 17 performs various displays on a display screen on the basis of an instruction from the camera control unit 20. For example, image data of which a resolution is converted for display by the camera signal processing unit 20 is supplied, and the display unit performs display on the basis of the image data in response to the instruction from the camera control unit 20. As a result, a captured image in a standby state, a so-called through image (monitoring image of subject) is displayed.

Furthermore, the display unit displays a reproduced image of image data read from a recording medium by the recording unit 16.

The display unit as a graphical user interface (GUI) displays various operation menus, icons, messages or the like on a screen in response to the instruction from the camera control unit 20.

The communication unit 18 wiredly or wirelessly performs data communication or network communication with an external device.

For example, image data (still image file or moving image file) is transmitted and output to an external display device, recording device, reproducing device, or the like, particularly, the editing device 70 in the present embodiment.

Furthermore, as a network communication unit, the communication unit 18 may perform communication via various networks, for example, the Internet, a home network, a local area network (LAN), or the like and may exchange various type of data with a server, a terminal, or the like on the network.

For example, the communication unit 18 outputs file data in which re-signature data 35, edited image data 31a, and metadata to be described later are integrated.

The operation unit 19 collectively represents input devices used to perform various operation inputs by a user. Specifically, the operation unit 19 represents various operation elements (keys, dials, touch panel, touch pad, or the like) provided in the housing of the imaging device 1.

The operation unit 19 detects a user's operation, and a signal according to the input operation is sent to the camera control unit 20.

The camera control unit 20 includes a microcomputer (arithmetic processing device) including a central processing unit (CPU).

The memory unit 22 stores information or the like used for processing by the camera control unit 20. The illustrated memory unit 22 comprehensively represents, for example, a read only memory (ROM), a random access memory (RAM), a flash memory, or the like.

The memory unit 22 may be a memory region built in a microcomputer chip as the camera control unit 20 or may be configured by a separate memory chip.

The camera control unit 20 controls the entire imaging device 1 by executing a program stored in the ROM, the flash memory, or the like of the memory unit 22.

For example, the camera control unit 20 controls operations of necessary units such as control of a shutter speed of the imaging unit 13, instructions of various types of signal processing by the camera signal processing unit 15, acquisition of lens information, an imaging operation and a recording operation in response to a user's operation, control of start/end of moving image recording, a reproduction operation of a recorded image file, camera operations such as zoom, focus, or exposure adjustment of a lens barrel, a user interface operation, or the like.

The camera control unit 20 generates metadata to be added to image data using information or the like from the imaging unit 13, the camera signal processing unit 15, or the like.

Details of the camera control unit 20 will be described later.

The connector unit 21 includes a holder such as a remote terminal or a USB terminal, a jack of an AC power supply, or the like and, for example, serves as an interface with an external terminal to be described later.

The RAM in the memory unit 22 is used to temporarily store data, programs, or the like as a working region when the CPU of the camera control unit 20 executes various types of data processing.

The ROM and the flash memory (nonvolatile memory) in the memory unit 22 are used to store application programs for various behaviors, firmware, or the like in addition to an operating system (OS) for controlling each unit by the CPU and a content file such as an image file.

The sensor unit 23 comprehensively represents various sensors mounted on the imaging device 1. As the sensor unit 23, for example, a position information sensor such as a global positioning system (GPS), a temperature sensor, an atmosphere pressure sensor, an illuminance sensor, an acceleration sensor, or the like are mounted.

The imaging device 1 having the above functions executes processing for realizing the present technology.

Figure 4:
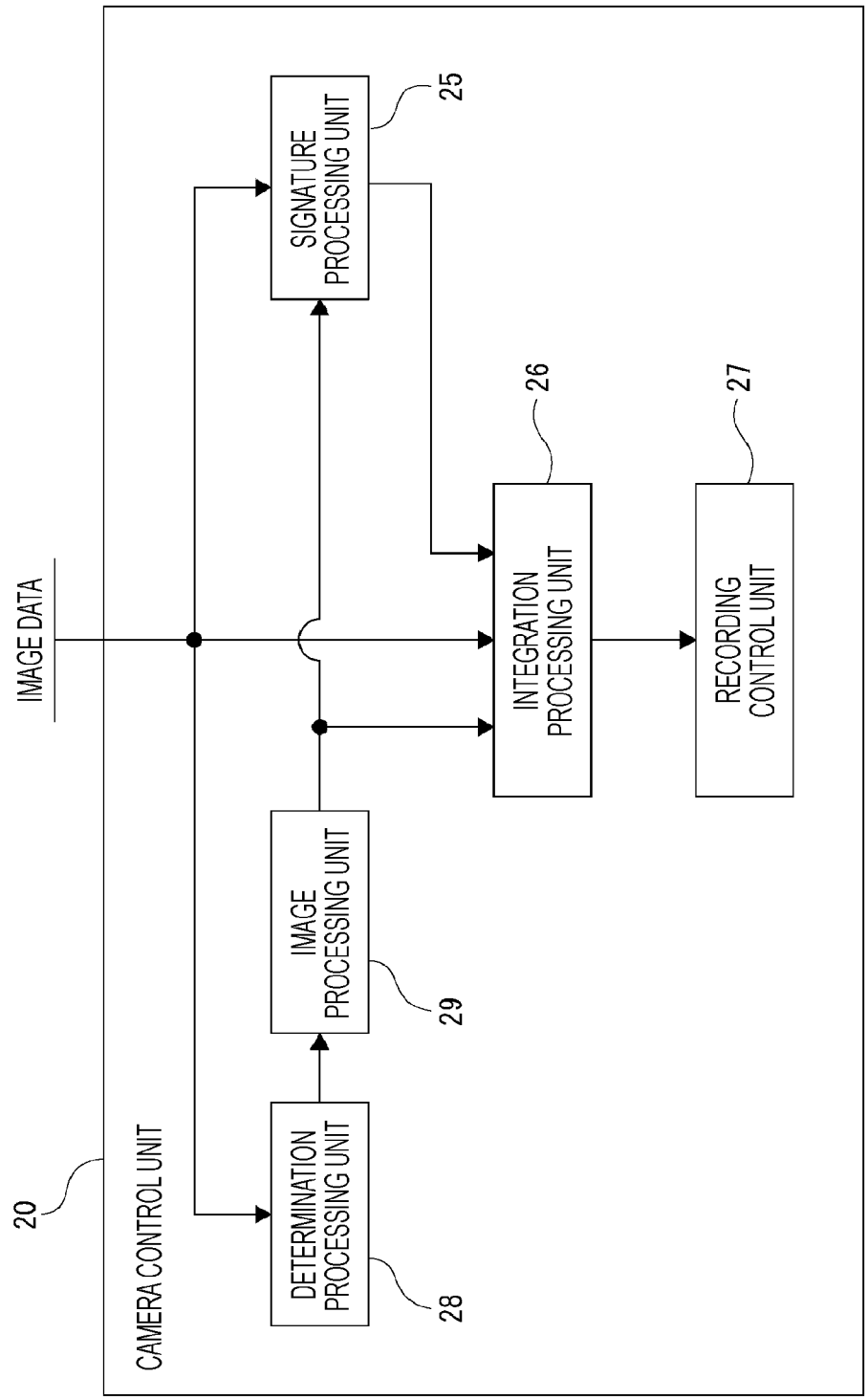
FIG. 4 is a block diagram illustrating functions of a camera control unit according to the embodiment.

Here, an outline of a functional configuration of the camera control unit 20 for realizing the present technology will be described with reference to FIG. 4.

The camera control unit 20 includes a signature processing unit 25, an integration processing unit 26, a recording control unit 27, a determination processing unit 28, and an image processing unit 29.

Each functional configuration of the camera control unit 20 executes each processing in response to acquisition of image data. Note that, here, the image data includes image data acquired by performing imaging by the imaging device 1, image data acquired from an external device such as the editing device 70, or the like. For example, it is considered that the imaging device 1 acquires the image data from the external device via the removable recording medium 24 such as an SD memory card or acquires the image data by executing communication processing via a transmission path such as the Internet or communicating with various devices through wired/wireless communication, bus communication, or the like.

At the time of imaging, the signature processing unit 25 generates signature data using image data of an own device captured image and metadata added to the image data. The own device indicates the imaging device 1, and the own device captured image indicates an image captured by the imaging device 1.

Furthermore, when the signature processing unit 25 acquires the image data of the own device captured image to which metadata including an edition parameter is added from the editing device 70, re-signature data different from the signature data at the time of imaging is generated using the acquired image data and the metadata added to the image data.

Here, the edition parameter indicates various parameters used when the editing device 70 executes image editing processing on the image data of the own device captured image, and is a parameter used for, for example, image effect processing such as white balance processing, luminance processing, color processing, contrast adjustment processing, sharpness adjustment processing, or skin beautifying processing, image correction processing, or the like.

The signature processing unit 25 calculates a hash value using the image data and the metadata added to the image data and encrypts the calculated hash value using the secret key in the public key encryption system acquired from the UIM issued by the certification authority 2 illustrated in FIG. 1 so as to generate signature data and re-signature data.

The verification device 4 side of the verification service registers an image file of the image data to which the metadata including such signature data and re-signature data is added, and the verification device 4 side of the verification service collates a hash value calculated from an image file of which authenticity is verified and a hash value obtained by decrypting the signature data or the re-signature data using the public key, and thereby, it is possible to verify the authenticity of the image to be verified.

The integration processing unit 26 generates an image file by integrating image data with the metadata that is added to the image data and includes the signature data or the re-signature data.

The recording control unit 27 makes the recording unit 16 illustrated in FIG. 3 record the generated image file in the removable recording medium 24.

The determination processing unit 28 executes determination processing for determining whether or not the image data is an own device captured image captured by the imaging device 1 on the basis of the metadata corresponding to the image data input from outside of the imaging device 1.

For example, the determination processing unit 28 determines whether or not the image data is an own device captured image by collating information, such as a model name, a manufacturer, or a serial number of a device that has performed imaging, added to the image data input from the outside of the imaging device 1 with the imaging device 1.

The image processing unit 29 acquires captured image data of the own device captured image to which the metadata including the edition parameter is added from the editing device 70 so as to be able to generate edited image data that is image data obtained by executing image processing on the captured image data using the edited image data.

<4. Configuration of Editing Device>

Next, a configuration example of the editing device 70 as an external device will be described with reference to FIG. 5.

It is considered that various devices may serve as the editing device 70, such as various devices having an image editing function, a terminal device, or other imaging devices.

Hereinafter, an example in which the editing device 70 is realized as a computer device will be described.

Figure 5:
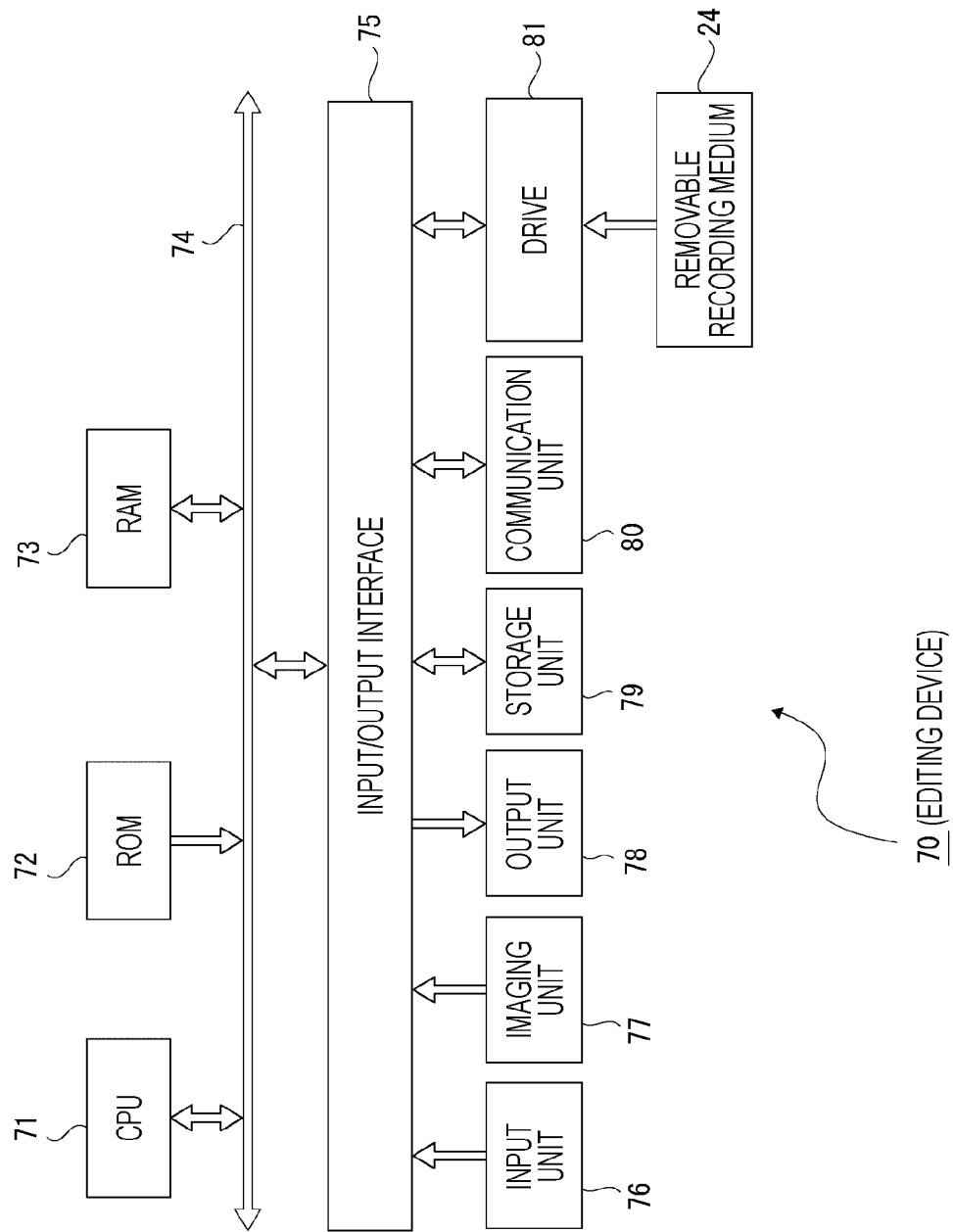
FIG. 5 is a block diagram of an editing device according to the embodiment.

In FIG. 5, a central processing unit (CPU) 71 of the editing device 70 executes various types of processing according to a program stored in a read only memory (ROM) 72 or a program loaded from a storage unit 79 to a random access memory (RAM) 73. The RAM 73 also appropriately stores data or the like necessary for the CPU 71 to execute various types of processing.

The CPU 71, the ROM 72, and the RAM 73 are connected to each other via a bus 74.

The CPU 71 controls the entire editing device 70. For example, the CPU 71 executes image editing processing on an acquired image data. Details of the CPU 71 will be described later.

The bus 74 is also connected to an input/output interface 75.

The input/output interface 75 is connected to an input unit 76 that includes a keyboard, a mouse, a touch panel, or the like, an imaging unit 77 that includes a lens system including an imaging lens, a diaphragm, a zoom lens, a focus lens, or the like, a driving system that make the lens system perform a focus behavior and a zoom behavior, a solid-state imaging element array that detects imaging light obtained by the lens system and performs photoelectric conversion so as to generate an imaging signal, or the like, an output unit 78 that includes a display including a liquid crystal display (LCD), a cathode ray tube (CRT), an organic electroluminescence (EL) panel, or the like, a speaker, or the like, and a hard disk drive (HDD).

For example, the output unit 78 displays an image, a moving image to be processed, or the like for various types of image processing on a display screen in response to an instruction of the CPU 71. Furthermore, the output unit 78, as a graphical user interface (GUI), displays various operation menus, icons, messages, or the like on the basis of the instruction of the CPU 71.

There are some cases where the input/output interface 75 is connected to the storage unit 79 including a hard disk, a solid-state memory, or the like or a communication unit 80 including a modem or the like.

The communication unit 80 executes communication processing via a transmission path such as the Internet or communicates with various devices through wired/wireless communication, bus communication, or the like.

Furthermore, the input/output interface 75 is connected to a drive 81 as necessary, and the removable recording medium 24 such as a magnetic disk, an optical disk, a magneto-optical disk, or a semiconductor memory is appropriately attached to the input/output interface 75.

With the drive 81, data files such as an image file, various computer programs, or the like can be read from the removable recording medium 24. The read data file is stored in the storage unit 79, or an image or sound included in the data is output by the output unit 78. Furthermore a computer program or the like read from the removable recording medium 24 is installed in the storage unit 79 as necessary.

The editing device 70 can install software for image processing, for example, as an image processing apparatus according to the present disclosure via the network communication by the communication unit 80 or the removable recording medium 24. Alternatively, the software may be stored in the ROM 72, the storage unit 79, or the like in advance.

The editing device 70 having the above functions executes the image editing processing on the acquired image data.

Figure 6:
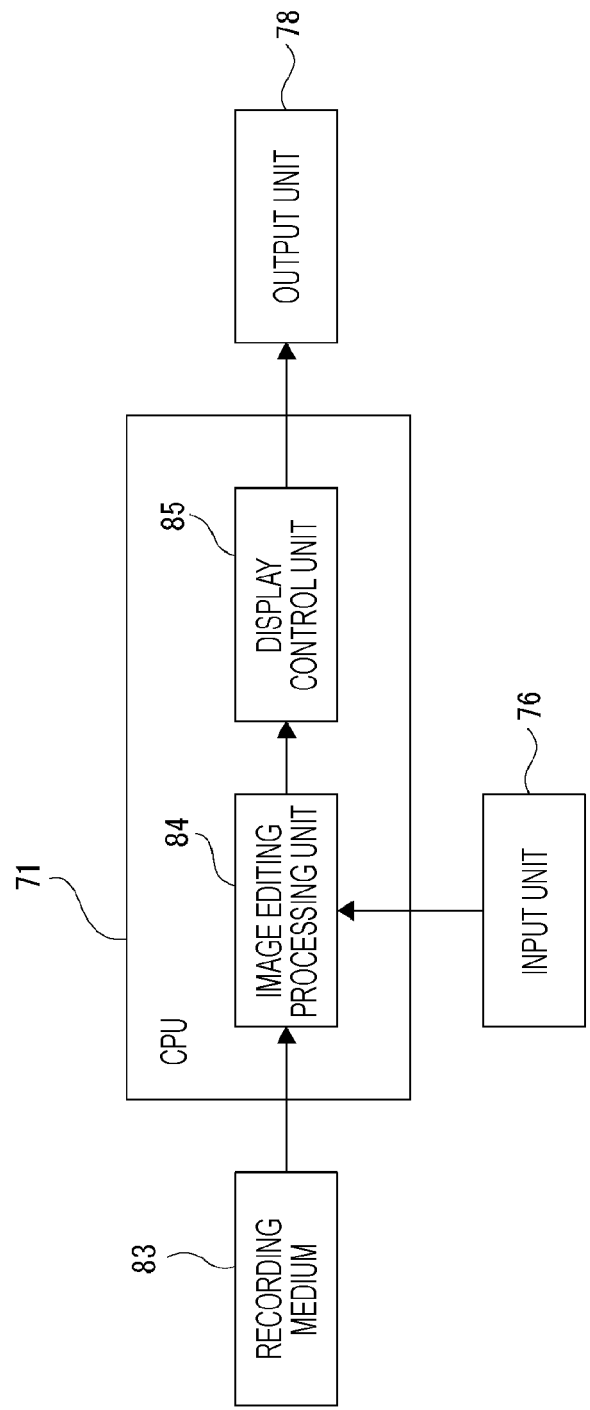
FIG. 6 is an explanatory diagram illustrating functions of a CPU according to the embodiment.

Here, a functional configuration of the CPU 71 according to the present disclosure will be described with reference to FIG. 6. In FIG. 6, for convenience of description, the other functional configurations of the editing device 70 are simply illustrated.

The CPU 71 includes an image editing processing unit 84 and a display control unit 85.

The image editing processing unit 84 acquires an image file generated by the imaging device 1 from a recording medium 83. For example, the recording medium 83 is the removable recording medium 24, and the image editing processing unit 84 acquires the image file generated by the imaging device 1 from the removable recording medium 24 connected to the drive 81.

Note that the recording medium 83 can receive the image file generated by the imaging device 1 by the communication unit 80 or can read the image file that is generated by the imaging device 1 and is stored in the storage unit 79.

The image editing processing unit 84 executes image editing processing such as white balance processing or contrast adjustment processing according to an editing operation of a user on the input unit 76.

The display control unit 85 controls display of an edited image on a display unit of the output unit 78 on the basis of the image data on which the image editing processing has been executed.

When the image editing processing is completed, the image editing processing unit 84 adds an edition parameter in the image editing processing to the image file as metadata and records the image file with the edition parameter, for example, in the removable recording medium 24 of the recording medium 83.

<5. Structure of Image File>

Figure 7:
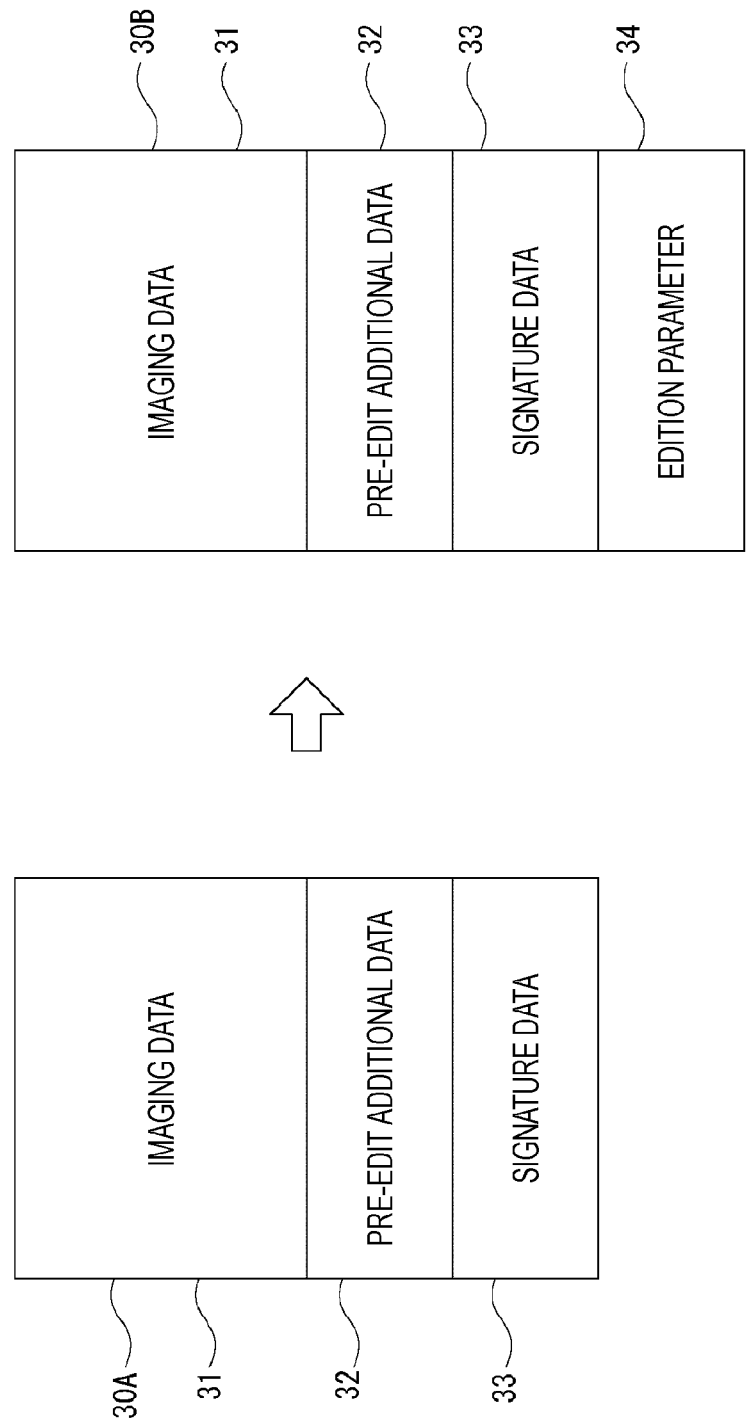
FIG. 7 is an explanatory diagram illustrating a structure of an image file according to the embodiment.
Figure 8:
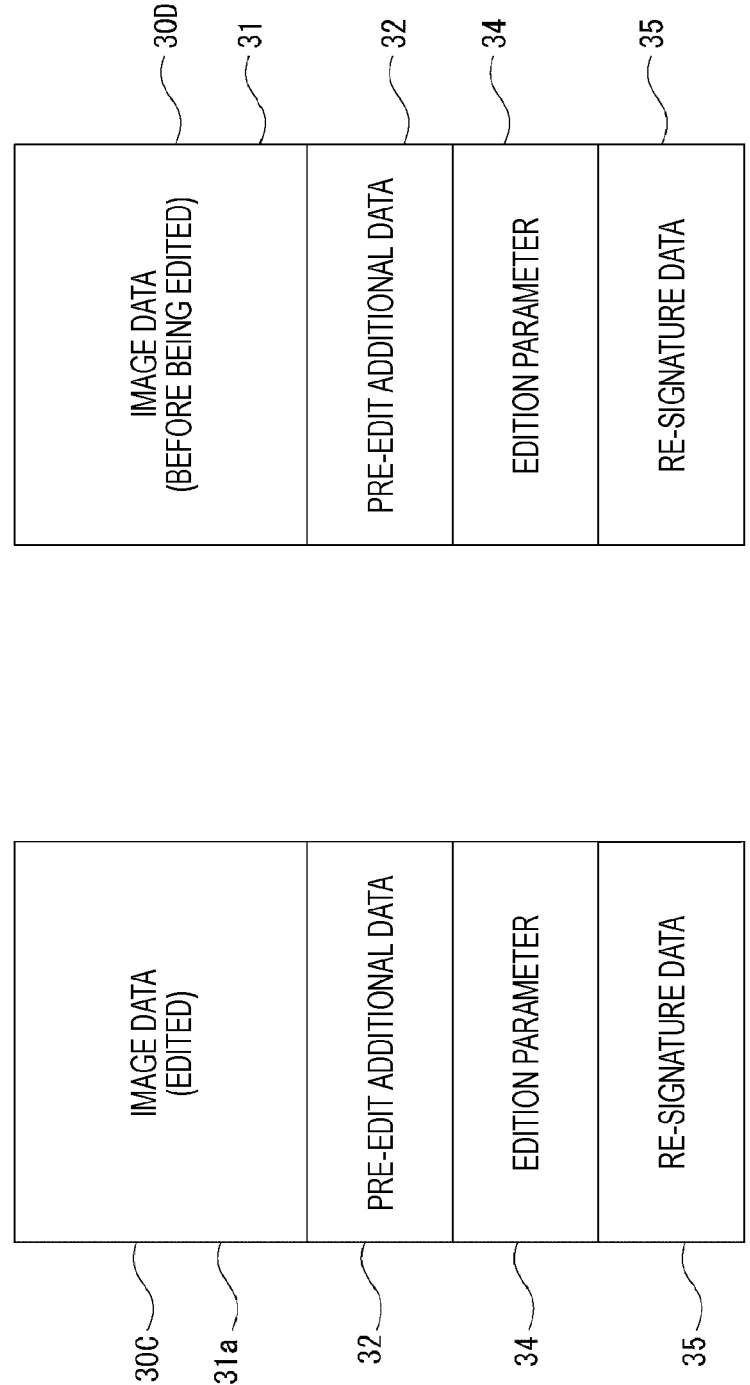
FIG. 8 is an explanatory diagram illustrating a type of the structure of the image file according to the embodiment.

A structure of the image file according to the present technology will be described with reference to FIGS. 7 and 8.

FIG. 7A illustrates an image file generated by the imaging device 1, and FIG. 7B illustrates an image file, generated by the editing device 70, on which the image editing processing has been executed.

For the image data captured by the imaging device 1, the imaging device 1 generates an image file 30A illustrated in FIG. 7A.

In the image file 30A, metadata including pre-edit additional data 32 and signature data 33 is added to image data 31.

The image data 31 is image data obtained by the imaging device 1 at the time of imaging. The image data 31 may be Raw data or data processed by the camera signal processing unit 15 of the imaging device 1. Furthermore, in a case where the imaging device 1 that has performed imaging, not an external device, executes image processing such as edition on the image data 31, the image-processed image data 31 may be used.

The pre-edit additional data 32 is metadata that is added at a timing when the image data 31 is captured, and includes information regarding the imaging device 1, information regarding the captured image data 31, or the like.

The information regarding the imaging device 1 is, for example, a model name, a manufacturer, a serial number, or the like and is information used to specify the imaging device 1 that has captured an image.

The information regarding the image data is, for example, information such as a distance to a subject at an imaging timing, a focal distance of an imaging lens, an imaging position, brightness of imaging environment (EV value), sensitivity (ISO sensitivity), an aperture (F value) setting value, a shutter speed (SS value), a date and time of imaging, a temperature, or an atmospheric pressure and information regarding various parameters used for image processing in a case where the imaging device 1 has executed the image processing such as white balance processing or contrast adjustment processing on the image data.

The pre-edit additional data 32 includes various types of data regarding captured image data in addition to the above.

The signature data 33 is metadata added at a timing when the image data 31 is captured. The signature data 33 is generated by calculating a hash value using the image data 31 and the pre-edit additional data 32 and encrypting the calculated hash value using a secret key in the public key encryption system.

The imaging device 1 generates the image file 30A by integrating the image data 31, the pre-edit additional data 32, and the signature data 33 and records the generated image file 30A, for example, in the removable recording medium 24 connected to the imaging device 1. By connecting the removable recording medium 24 to the editing device 70, the editing device 70 can execute the image editing processing on the image data 31 of the image file 30A through a user's editing operation.

When the image editing processing by the editing device 70 on the image data 31 of the image file 30A acquired from the imaging device 1 is completed, the editing device 70 generates an image file 30B as illustrated in FIG. 7B.

In the image file 30B, metadata including the pre-edit additional data 32, the signature data 33, and an edition parameter 34 is added to the image data 31.

The edition parameter 34 is metadata added to the image data 31 at a timing when the image data 31 acquired from the imaging device 1 is edited, and includes various parameters used when the editing device 70 executes the image editing processing such as the white balance processing or the contrast adjustment processing on the image data 31.

The editing device 70 generates the image file 30B by integrating the image data 31, the pre-edit additional data 32, the signature data 33, and the edition parameter 34. The image data 31 of the image file 30B at this time is image data before the image editing processing is executed by the editing device 70.

The editing device 70 records the generated image file 30B, for example, in the removable recording medium 24 connected to the editing device 70 or the like.

In this way, the image file 30B is generated so as to include the image data 31 generated by the imaging device 1 at the imaging timing and the edition parameter 34 used for the image editing processing by the editing device 70, not the image data on which the image editing processing has been executed by the editing device 70.

This is because it is not possible to secure security at the time of edition, such as falsification by malware, when the editing device 70 of the external device executes the image editing processing on the image data 31 used to generate signature data by the imaging device 1.

Therefore, it is desirable that the image processing on the image data 31 be executed by the imaging device 1 that has a low possibility of facing a threat of malware or the like.

By connecting the removable recording medium 24 in which the image file 30B is recorded to the imaging device 1, the imaging device 1 acquires the image file 30B generated by the editing device 70.

The imaging device 1 generates an image file 30C as illustrated in FIG. 8A on the basis of the acquired image file 30B.

In the image file 30C, metadata including the pre-edit additional data 32, the edition parameter 34, and the re-signature data 35 is added to the edited image data 31a.

The edited image data 31a is image data generated by executing image processing on the image data 31 of the acquired image file 30B on the basis of the edition parameter 34 by the imaging device 1.

The re-signature data 35 is metadata added at a timing when the edited image data 31a is generated.

The re-signature data 35 is generated by calculating a hash value using the edited image data 31a, the pre-edit additional data 32, and the edition parameter 34 and encrypting the calculated hash value using a secret key in the public key encryption system.

The imaging device 1 generates the image file 30C by integrating the edited image data 31a, the pre-edit additional data 32, the edition parameter 34, and the re-signature data 35. As a result, the image file 30C including the edited image data 31a that is edited on the basis of the edition parameter 34 is generated.

As a result, the imaging device 1 that has a low possibility of facing a threat of malware or the like can execute image processing on the image data 31 using the edition parameter 34, and it is possible to generate the re-signature data 35 by executing signature processing on the edited image data 31a again after being edited.

The imaging device 1 records the generated image file 30C, for example, in the connected removable recording medium 24 or the like.

Note that, in the image file 30C, the metadata including the pre-edit additional data 32, the edition parameter 34, and the re-signature data 35 is added to the edited image data 31a. However, as in an image file 30D illustrated in FIG. 8B, the metadata including the pre-edit additional data 32, the edition parameter 34, and the re-signature data 35 may be added to the image data 31 generated at the timing of imaging.

In this way, in the image file 30D, by generating the image file by adding the edition parameter 34 to the image data 31 before the image processing is executed on the basis of the edition parameter 34, in a case where edition is performed a plurality of times, the image processing is executed on the image data 31 before being edited on the basis of each edition parameter. Accordingly, it is possible to easily reproduce image data edited in the past.

<5. Processing for Realizing Embodiment>

Each of processing by the camera control unit 20 of the imaging device 1 and processing by the CPU 71 of the editing device 70 that are executed to realize the embodiment described above will be described with reference to FIGS. 9 to 11.

First, with reference to FIG. 9, processing for performing an electronic signature on the image data 31 captured by the imaging device 1 by the camera control unit 20 of the imaging device 1 will be described.

Figure 9:
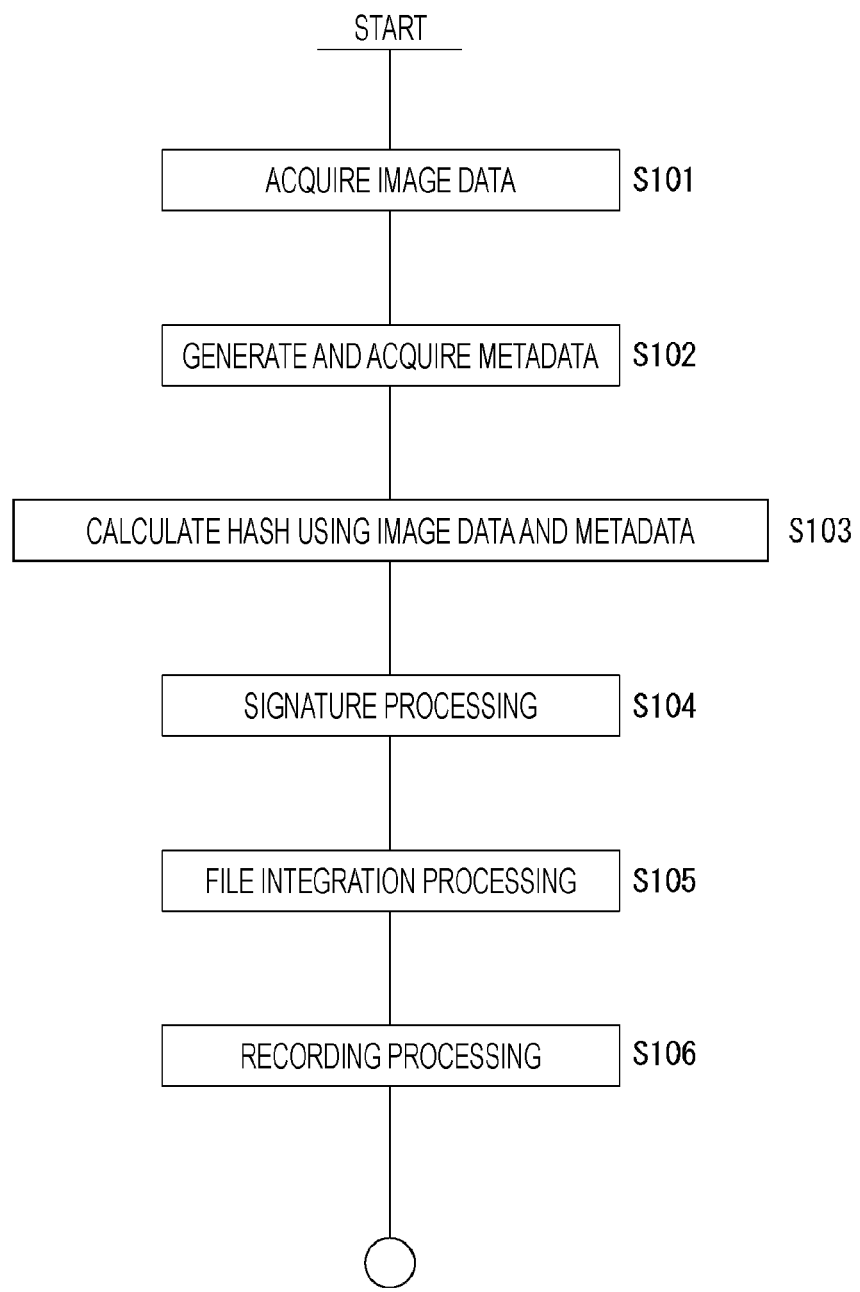
FIG. 9 is a flowchart of a processing example of the imaging device according to the embodiment.

The camera control unit 20 executes the processing in FIG. 9, for example, at a timing of imaging by the imaging device 1.

In step S101, the camera control unit 20 acquires image data from the camera signal processing unit 15.

Then, in step S102, the camera control unit 20 generates and acquires metadata including the pre-edit additional data 32 such as the information regarding the imaging device 1 or the information regarding the image data 31.

The information regarding the imaging device 1 is, for example, information, used to specify the imaging device 1 that has captured an image, such as a model name, a manufacturer, or a serial number. Furthermore, for example, the information regarding the image data 31 is various parameters of the captured image data 31 or the like.

In step S103, the camera control unit 20 calculates a hash value for the metadata including the image data 31 and the pre-edit additional data 32 corresponding to the image data 31.

By calculating the hash value including not only the image data 31 but also the metadata corresponding to the image data 31, at the time of comparison with the image data 31 to be verified in verification processing by the verification device 4 side, the comparison can be performed including the metadata at the time of imaging.

The camera control unit 20 performs signature processing in step S104. That is, the camera control unit 20 acquires a secret key from the memory unit 22 and encrypts the hash value calculated in step S103 using the secret key so as to generate the signature data 33. The camera control unit 20 records the secret key acquired from the UIM in the memory unit 22 in advance.

As a result, a third party who has a public key can acquire the hash value added to the image data 31 by decrypting the signature data 33.

Then, the camera control unit 20 executes file integration processing in step S105. That is, the camera control unit 20 integrates the signature data 33 generated using the hash value with the metadata including the image data 31 and the pre-edit additional data 32 so as to generate the image file 30A as illustrated in FIG. 7A.

In step S106, the camera control unit 20 executes recording processing for recording the generated image file 31, for example, in the removable recording medium 24 or the like.

According to the above processing illustrated in FIG. 9, the electronic signature is formed for and is associated with the image data 31 captured by the imaging device 1.

Note that, in step S104, the camera control unit 20 may execute the signature processing in a state of being connected to the UIM such as a USB issued from the certification authority 2. That is, a function of the signature processing unit 25 of the camera control unit 20 may be realized by being connected to the UIM.

In this case, the camera control unit 20 transmits the calculated hash value to the UIM and requests the UIM to generate the signature data 33.

The UIM acquires the secret key stored in the memory unit or the like of the own device and encrypts the hash value acquired from the camera control unit 20 using the secret key so as to generate the signature data 33.

Thereafter, the UIM transmits the generated signature data 33 and the public key to the camera control unit 20. As a result, the camera control unit 20 can acquire the signature data 33.

Next, processing for generating the image file 30B as illustrated in FIG. 7B by the CPU 71 of the editing device 70 will be described with reference to FIG. 10.

The CPU 71 executes the image editing processing on the image data 31 captured by the imaging device 1 and generates the image file 30B in which the edition parameter 34 used for the image editing processing is added to the image data 31 as metadata.

Figure 10:
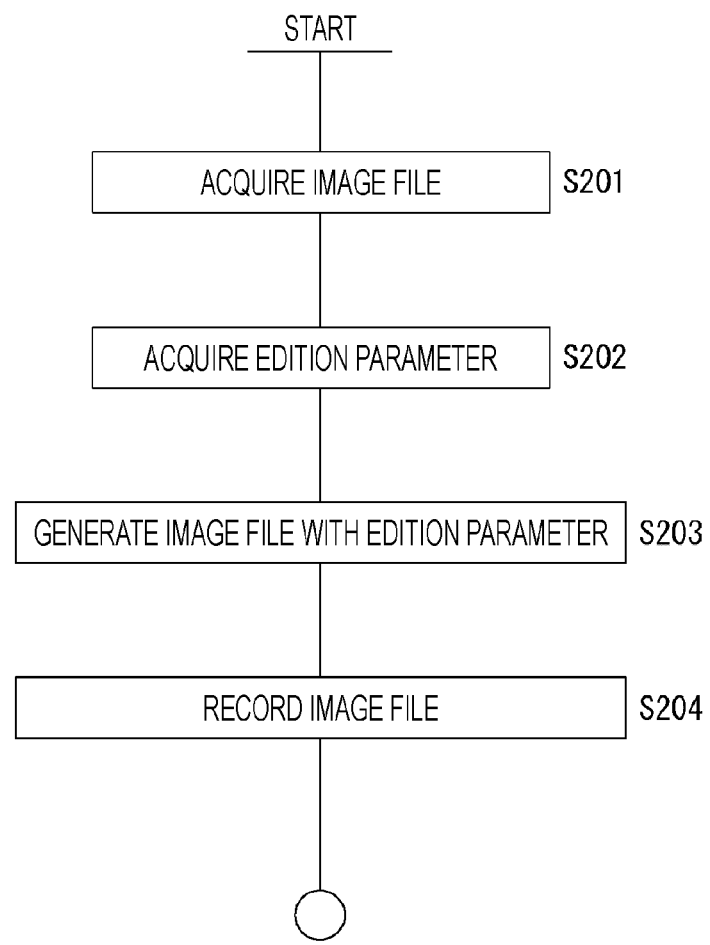
FIG. 10 is a flowchart of a processing example of the editing device according to the embodiment.

The CPU 71 executes the processing in FIG. 10, for example, at a timing when the editing device 70 has completed the image editing processing on the image data 31.

In step S201, the CPU 71 acquires the image file 30A generated by the imaging device 1 according to the processing in FIG. 9 from the removable recording medium 24 or the like. Then, in step S202, the CPU 71 acquires the edition parameter 34 used for the image editing processing on the image data 31.

In step S203, the CPU 71 adds the edition parameter 34, in addition to the pre-edit additional data 32 and the signature data 33, to the image data 31 as metadata and integrates each piece of data so as to generate the image file 30B with the edition parameter 34 as illustrated in FIG. 7B.

As a result, the image file 30B is generated in a state of including the image data 31 generated at the timing of imaging by the imaging device 1 and the edition parameter 34 used for the image editing processing by the editing device 70, not the image data on which the image editing processing has been executed by the editing device 70.

Then, in step S204, the CPU 71 executes processing for recording the generated image file 30B in the removable recording medium 24 or the like.

According to the above processing illustrated in FIG. 10, the image file 30B with the edition parameter 34 including edition content of the editing device 70 as the edition parameter 34 is generated.

Finally, processing for performing an electronic signature again on the edited image data 31a obtained by editing the image data 31 by the camera control unit 20 of the imaging device 1 will be described with reference to FIG. 11.

Figure 11:
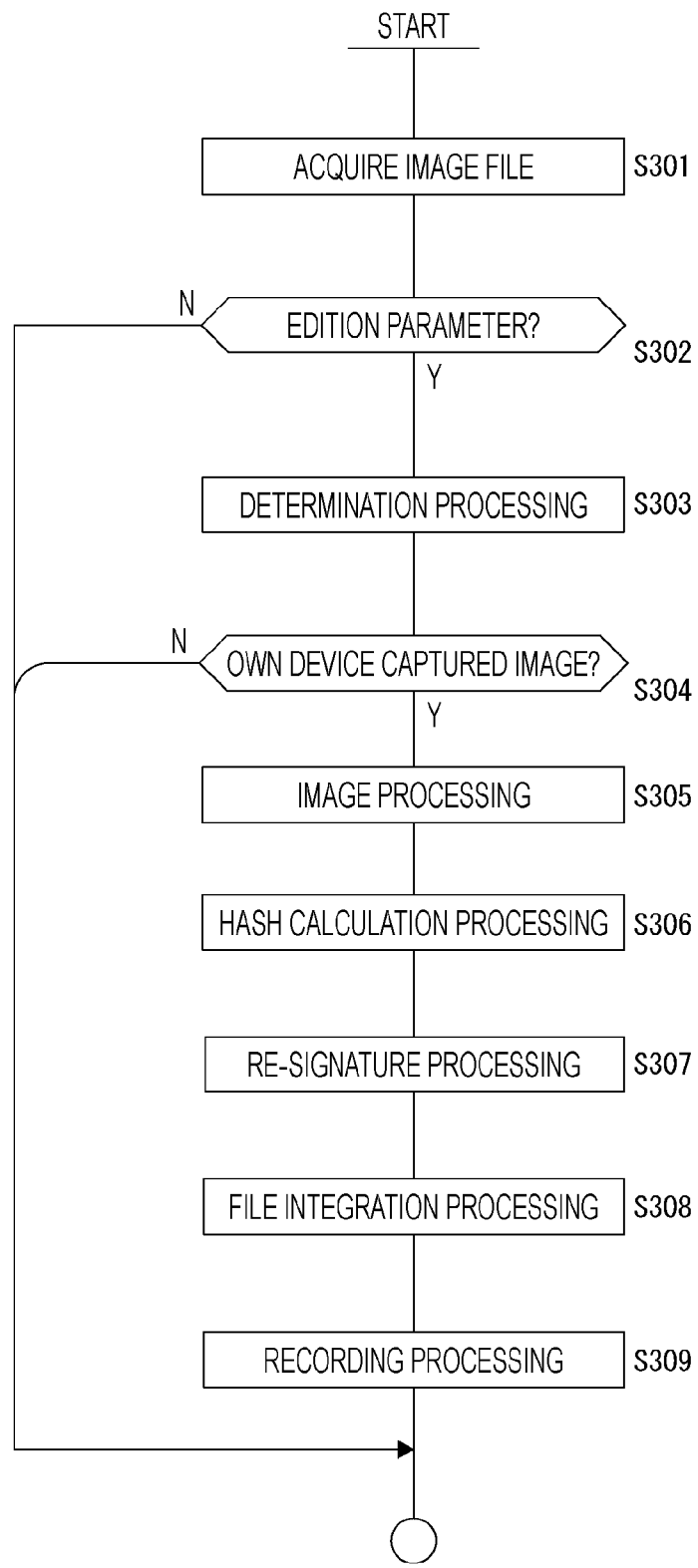
FIG. 11 is a flowchart of a processing example of the imaging device according to the embodiment.

The camera control unit 20 executes, for example, the processing in FIG. 11 at a timing when acquiring the image file 30B from the editing device 70 that is an external device.

In step S301, the camera control unit 20 acquires an image file from outside of the imaging device 1. In the embodiment, the camera control unit 20 connects the removable recording medium 24 that stores the image file 30B generated by the editing device 70 to the imaging device 1 so as to acquire the image file 30B from the removable recording medium 24.

In step S302, the camera control unit 20 determines whether or not image data of the acquired image file is the image data 31 that is not edited by the editing device 70 and whether or not the edition parameter 34 related to the edition processing by the editing device 70 is added as metadata.

In a case where the editing device 70 has executed the image editing processing on the image data acquired in step S302 or in a case where the acquired image file does not include the edition parameter 34, the camera control unit 20 ends the processing in FIG. 11 without executing the re-signature processing on the acquired image file again.

In a case where the image file includes the edition parameter 34 in step S302, the camera control unit 20 proceeds the processing to step S303 and executes determination processing.

Specifically, the camera control unit 20 collates information such as a model name, a manufacturer, or a serial number of a device that has performed imaging in the pre-edit additional data 32 added to the image file acquired from the removable recording medium 24 with corresponding information included in the imaging device 1 so as to determine whether or not the image data is an own device captured image.

According to the result of the determination processing in step S303, processing by the imaging device 1 in step S304 is branched.

When it is determined in step S303 that the image data 31 is not the own device captured image, the camera control unit 20 proceeds the procedure to step S304, and ends the processing in FIG. 11.

When it is determined in step S303 that the image data 31 is the own device captured image, the camera control unit 20 proceeds the procedure from step S304 to step S305.

In step S305, the camera control unit 20 executes image processing on the image data 31. The camera control unit 20 executes image processing, for example, white balance processing, contrast adjustment processing, or the like on the image data 31 on the basis of the edition parameter 34 included in the image file. As a result, the camera control unit 20 generates the edited image data 31a.

Thereafter, the camera control unit 20 executes hash calculation processing in step S306.

Specifically, the camera control unit 20 calculates a hash value for the edited image data 31a and metadata including the pre-edit additional data 32 and the edition parameter 34.

Then, the camera control unit 20 executes the re-signature processing in step S307. That is, the camera control unit 20 acquires a secret key from the memory unit 22 and encrypts the hash value calculated in step S306 using the secret key so as to generate the re-signature data 35.

Then, the camera control unit 20 executes the file integration processing in step S308. That is, the camera control unit 20 integrates the edited image data 31a and the metadata including the pre-edit additional data 32, the edition parameter 34, and the re-signature data 35 so as to generate the image file 30C as illustrated in FIG. 8A.

In step S309, the camera control unit 20 executes the recording processing for recording the generated image file 30C in the removable recording medium 24 or the like.

According to the above processing illustrated in FIG. 11, the imaging device 1 generates the edited image data 31a using the edition parameter 34 used in the image editing processing by the editing device 70, and the electronic signature is formed for and is associated with the edited image data 31a.

Note that, in step S307, the camera control unit 20 may execute the signature processing in a state of being connected to the UIM such as a USB issued from the certification authority 2. That is, a function of the signature processing unit 25 of the camera control unit 20 may be realized by being connected to the UIM.

In this case, the camera control unit 20 transmits the calculated hash value to the UIM and requests the UIM to generate the re-signature data 35.

The UIM acquires the secret key stored in the memory unit or the like of the own device and encrypts the hash value acquired from the camera control unit 20 using the secret key so as to generate the re-signature data 35.

Thereafter, the UIM transmits the generated re-signature data 35 and the public key to the camera control unit 20. As a result, the camera control unit 20 can acquire the re-signature data 35.

Furthermore, in the present embodiment, the camera control unit 20 executes the image processing in step S305. However, the camera control unit 20 does not need to execute the image processing.

In this case, when the camera control unit 20 determines in step S303 that the image data is the own device captured image, the camera control unit 20 proceeds the procedure in an order of steps S304, S305, and S306.

In step S306, the camera control unit 20 calculates a hash value for the image data 31 of which the image processing is not executed and the metadata including the pre-edit additional data 32 and the edition parameter 34.

Then, in step S307, the camera control unit 20 executes the re-signature processing for generating the re-signature data 35 by encrypting the calculated hash value using the secret key.

Thereafter, in step S308, the camera control unit 20 integrates the image data 31 on which the image processing is not executed with the metadata including the pre-edit additional data 32, the edition parameter 34, and the re-signature data 35 so as to generate the image file 30D as illustrated in FIG. 8B.

In step S309, the camera control unit 20 executes the recording processing for recording the generated image file 30D, for example, in the removable recording medium 24.

<7. Summary>

The imaging device 1 (camera control unit 20) according to the embodiment includes the determination processing unit 28 that executes the determination processing for determining whether or not the image data is the own device captured image captured by the imaging image 1 on the basis of the metadata corresponding to the image data input from outside of the own device (imaging device 1) and the signature processing unit 25 that acquires the re-signature data 35 different from the signature data 33 at the time of imaging using the image data and the metadata, for the image data that is determined as the own device captured image by the determination processing unit 28 (refer to FIG. 11).

As a result, the imaging device 1 that has captured the image data can update the signature data 33 for the captured image data to the re-signature data 35.

By executing the signature processing on the image data by the imaging device 1 that has a lower possibility for causing an intervention of malware than a general-purpose computer or the like, it is possible to prevent falsification of signature data, and it is possible to safely sign the edited image data. That is, security when the electronic signature is formed for and is associated with the image data is improved.

Furthermore, because one system can sign both of the image data at the time of imaging and the edited image data in the imaging device 1, it is possible to reduce system design cost.

In the imaging device 1 (camera control unit 20) according to the embodiment, the signature processing unit 25 acquires the image data 31 captured by the own device (imaging device 1) and the signature data 33 using the metadata corresponding to the image data 31 (refer to S104 in FIG. 9 or the like).

As a result, for example, at the timing when the imaging device 1 performs imaging, the imaging device 1 can acquire the captured image data 31 and the signature data 33 using the metadata corresponding to the image data 31.

By verifying the image data using the acquired signature data 33, it is possible to determine whether or not the image data captured by the own device (imaging device 1) is falsified.

In the imaging device 1 (camera control unit 20) according to the embodiment, the signature processing unit 25 generates the re-signature data 35 using the image data and the metadata for the image data that is determined as the own device captured image by the determination processing unit 28 (refer to S304 in FIG. 11).

As a result, the imaging device 1 that has captured the image, not the editing device 70, can execute the re-signature processing.

The re-signature data 35 is not acquired by the re-signature processing for the image data captured by a device, other than the imaging device 1, that is not a target of the re-signature processing by the imaging device 1 so that a processing load of the imaging device 1 can be reduced.

In the imaging device 1 (camera control unit 20) according to the embodiment, the determination processing unit 28 executes the determination processing on the image data that is input from outside of the own device (imaging device 1) and in which the edition parameter 34 related to the edition processing by the external device (editing device 70) is included in the metadata (refer to S302 in FIG. 11).

Because the metadata added to the image data includes the edition parameter 34 added by the editing device 70, it is necessary to execute the re-signature processing and acquire the re-signature data 35 so as to make it possible to verify authenticity of the image of the edited image data.

Therefore, for the image data, to which the edition parameter 34 is not added, that is not a target of the re-signature processing by the imaging device 1, the re-signature data 35 is not acquired by the re-signature processing so that the processing load of the imaging device 1 can be reduced.

In the imaging device 1 (camera control unit 20) according to the embodiment, in a case where the image data determined as the own device captured image by the determination processing unit 28 is the image data 31 that is not edited by the external device (editing device 70) and the edition parameter 34 related to the edition processing by the editing device 70 is added as the metadata, the signature processing unit 25 acquires the image data 31 determined as the own device captured image and the re-signature data 35 using the metadata (refer to S302 in FIG. 11).

That is, it is possible to acquire the image data 31 that is not edited by the editing device 70 and the re-signature data 35 using the metadata. As a result, in the processing for verifying the authenticity of the image by the verification device 4, it is possible to perform verification in consideration of the image data 31 and the metadata added to the image data 31.

In the imaging device 1 (camera control unit 20) according to the embodiment, the signature processing unit 25 acquires the image data determined as the own device captured image and the re-signature data 35 using the metadata including the edition parameter 34 (S307 in FIG. 11).

That is, it is possible to acquire the image data 31 that is not edited by the editing device 70 and the re-signature data 35 using the edition parameter 34. As a result, in the processing for verifying the authenticity of the image by the verification device 4, it is possible to perform verification in consideration of the image data 31 and the edition parameter 34 added to the image data 31.

The imaging device 1 (camera control unit 20) according to the embodiment includes the integration processing unit 26 that integrates the re-signature data 35 acquired by the signature processing unit 25, the image data determined as the own device captured image, and the metadata including the edition parameter 34 (refer to S308 in FIG. 11).

As a result, the image file 30D obtained by integrating the re-signature data 35, the image data 31 that is not edited by the editing device 70, and the metadata including the edition parameter 34 is generated (refer to FIG. 8B).

In the image file 30D, by generating the image file by adding the edition parameter 34 to the image data 31 before the image processing is executed on the basis of the edition parameter 34, in a case where edition is performed a plurality of times, the image processing is executed on the image data 31 before being edited on the basis of each edition parameter 34. Accordingly, it is possible to easily reproduce image data edited in the past.

The imaging device 1 (camera control unit 20) according to the embodiment includes the image processing unit 29 that generates the edited image data 31a by executing the image processing on the image data 31 using the edition parameter 34 in a case where the image data determined as the own device captured image in the determination processing is the image data 31 that is not edited by the external device (editing device 70) and the edition parameter 34 related to the edition processing by the external device (editing device 70) is added as the metadata.

That is, the image processing is executed on the image data 31 of the own device captured image in the imaging device 1 on the basis of the edition parameter 34 related to the edition processing by the editing device 70. As a result, the imaging device 1, of which the threat of falsification of the image data caused by malware or the like is lower than the external device, can edit the image data.

Furthermore, because the imaging device 1 can continuously execute the edition processing based on the edition parameter 34 and the re-signature processing on the image data, it is possible to avoid a situation where the image data is falsified from the edition of the image data to the first signature.

In the imaging device 1 (camera control unit 20) according to the embodiment, the signature processing unit 25 acquires the edited image data 31a and the re-signature data 35 using the metadata.

That is, it is possible to acquire the edited image data 31a and the re-signature data 35 using the metadata corresponding to the edited image data 31a. As a result, in the processing for verifying the authenticity of the image by the verification device 4, it is possible to perform verification in consideration of the edited image data 31a and the metadata added to the edited image data 31a.

In the imaging device 1 (camera control unit 20) according to the embodiment, the signature processing unit 25 acquires the edited image data 31a and the re-signature data 35 using the metadata including the edition parameter 34.

That is, it is possible to acquire the edited image data 31a and the re-signature data 35 using the edition parameter 34 corresponding to the edited image data 31a. As a result, in the processing for verifying the authenticity of the image by the verification device 4, it is possible to perform verification in consideration of the edited image data 31a and the edition parameter 34 added to the edited image data 31a.

The imaging device 1 (camera control unit 20) according to the embodiment includes the integration processing unit 26 that integrates the re-signature data 35 acquired by the signature processing unit 25 with the edited image data 31a and the metadata.

That is, the image file 30C obtained by integrating the re-signature data 35 that is metadata, the edited image data 31a, and metadata added to another piece of the edited image data 31a is generated (refer to FIG. 8A). As a result, the edited image data 31a can be re-signed.

In the imaging device 1 (camera control unit 20) according to the embodiment, the integration processing unit 26 integrates the re-signature data 35 acquired by the signature processing unit 25 with the edited image data 31a and the metadata including the edition parameter 34.

That is, the image file 30C obtained by integrating the re-signature data 35, the edited image data 31a, and the metadata including the edition parameter 34 is generated (refer to FIG. 8A). By including the edition parameter 34 in the image file 30C, it is possible to acquire the image data 31 before being edited using the edition parameter 34 for the edited image data 31a.

In the imaging device 1 (camera control unit 20) according to the embodiment, the determination processing unit 28 executes the determination processing using the information regarding the own device (imaging device 1) included in the metadata.

For example, the imaging device 1 executes the determination processing for determining whether or not the metadata corresponding to the image data input from outside of the imaging device 1 includes the information regarding the imaging device 1 such as the model name, the manufacturer, the serial number, or the like. Therefore, it is possible to determine whether or not the image data is the own device captured image captured by the imaging image 1 using the type information included in the imaging device 1.

In the imaging device 1 (camera control unit 20) according to the embodiment, the signature processing unit 25 calculates the hash value using the image data input from outside of the own device (imaging device 1) and the metadata corresponding to the image data and generates the re-signature data 35 using the calculated hash value (refer to S306 in FIG. 11).

As a result, for example, even if the image data is the same as the edited image data in the image file, in a case where the edition parameters 34 are different, different hash values are calculated.

As a result, even if the image data in the registered image file is the same as the image data to be verified, in a case where the metadata corresponding to the image data differs, the hash value also differs. Therefore, the verification device 4 determines that the image data has no authenticity. Therefore, it is possible to easily determine that one of the image data to be verified and the metadata corresponding to the image data is falsified.

In the imaging device 1 (camera control unit 20) according to the embodiment, the signature processing unit 25 generates the signature data 33 using the image data captured by the own device (imaging device 1) and the metadata corresponding to the image data (refer to S104 in FIG. 9).

That is, it is possible to acquire the image data 31 captured by the imaging device 1 and the signature data 33 using the metadata corresponding to the image data 31. As a result, in the processing for verifying the authenticity of the image by the verification device 4, it is possible to perform verification in consideration of the image data 31 and the metadata added to the image data 31.

In the imaging device 1 (camera control unit 20) according to the embodiment, the signature processing unit 25 calculates the hash value using the image data 31 captured by the own device (imaging device 1) and the metadata corresponding to the image data 31 and generates the signature data 33 using the calculated hash value (refer to S103 in FIG. 9).

As a result, even if the image data is the same as the image data 31 in the image file at the time of imaging, for example, in a case where parameters at the time of imaging are different, different hash values are different.

As a result, even if the image data in the registered image file is the same as the image data to be verified, in a case where the metadata corresponding to the image data differs, the hash value also differs. Therefore, the verification device 4 determines that the image data has no authenticity. Therefore, it is possible to easily determine that one of the image data to be verified and the metadata corresponding to the image data is falsified.

The imaging device 1 (camera control unit 20) according to the embodiment generates the re-signature data 35 using the hash value and the secret key in the public key encryption system (refer to S307 in FIG. 11). In a case where a user who has captured the image data has encrypted and transmitted the re-signature data using the secret key in the public key encryption system, if a third party who receives the re-signature data can decrypt the re-signature data with a public key corresponding to (paired) secret key, the receiver side can verify the transmission by the user who has captured the image data.

The imaging device 1 (camera control unit 20) according to the embodiment includes the communication unit 18 that outputs the file data in which the re-signature data 35, the edited image data 31a, and the metadata are integrated (refer to FIG. 3).

As a result, the file data in which the re-signature data 35 and the metadata to which the edited image data 31a is set are integrated can be transmitted to the verification device 4 that verifies authenticity of the own device captured image or the like.

The program according to the embodiment is, for example, a program for causing a CPU, a DSP, or the like or a device including these to execute the processing in FIGS. 9 and 10.

That is, the program according to the embodiment is a program for causing the imaging device to execute the determination processing for determining whether or not the image data is the own device captured image captured by the own device on the basis of the metadata corresponding to the image data input from outside the own device and the signature processing for acquiring the re-signature data different from the signature data at the time of imaging using the image data and the metadata for the image data determined as the own device captured image in the determination processing. Such a program can be implemented by, for example, a device such as the digital still camera 1A, the digital video camera 1B, and a mobile terminal such as a smartphone.

Such a program can be recorded in advance in an HDD as a recording medium built in a device such as a computer device, a ROM in a microcomputer including a CPU, or the like.

Alternatively, the program can be temporarily or permanently stored (recorded) in removable recording media such as a flexible disk, a compact disc read only memory (CD-ROM), a magnet optical (MO) disk, a digital versatile disc (DVD), a Blu-ray Disc (registered trademark), a magnetic disk, a semiconductor memory, or a memory card. Such removable recording media can be provided as so-called package software.

Furthermore, such a program can be installed from the removable recording medium to a personal computer or the like and also can be download from a download site via a network such as a local area network (LAN) or the Internet.

Furthermore, such a program is suitable for providing the image processing apparatus according to the embodiment to a wide range. For example, by downloading the program in a personal computer, a mobile information processing apparatus, a mobile phone, a game machine, a video device, a personal digital assistant (PDA), or the like, it is possible to make the personal computer or the like function as the image processing apparatus according to the present disclosure.

Note that the effects described in the present disclosure are only exemplary and not limited to these. Furthermore, there may be an additional effect.

Furthermore, the description of the embodiment described in the present disclosure is merely an example, and the present technology is not limited to the embodiment described above. Therefore, it is obvious that various modifications can be made according to design or the like without departing from the technical idea of the present technology, even a form other than the embodiment described above.

The present technology may have configurations below.

(1)
An imaging device including:
a determination processing unit configured to execute determination processing for determining whether or not image data is an own device captured image captured by an own device on the basis of metadata corresponding to the image data input from outside of the own device; and
a signature processing unit configured to acquire re-signature data different from signature data at the time of imaging using image data and metadata for the image data determined as an own device captured image by the determination processing unit.

(2)
The imaging device according to (1), in which
the signature processing unit acquires image data captured by the own device and the signature data using metadata corresponding to the image data.

(3)
The imaging device according to (1) or (2), in which
the signature processing unit generates the re-signature data using the image data and the metadata for the image data determined as an own device captured image by the determination processing unit.

(4)
The imaging device according to any one of (1) to (3), in which
the determination processing unit executes the determination processing on image data, input from outside of the own device, in which an edition parameter related to edition processing by an external device is included in metadata.

(5)
The imaging device according to any one of (1) to (4), in which
in a case where the image data determined as an own device captured image by the determination processing unit is image data that is not edited by the external device and the edition parameter related to the edition processing by the external device is added as metadata, the signature processing unit acquires the image data determined as an own device captured image and the re-signature data using metadata.

(6)
The imaging device according to (5), in which
the signature processing unit acquires the image data determined as an own device captured image and the re-signature data using metadata including the edition parameter.

(7)
The imaging device according to (6), further including
an integration processing unit configured to integrate the re-signature data acquired by the signature processing unit with the image data determined as an own device captured image and the metadata including the edition parameter.

(8)
The imaging device according to any one of (1) to (4), further including:
an image processing unit configured to generate edited image data by executing image processing on the image data using the edition parameter
in a case where the image data determined as an own device captured image in the determination processing is image data that is not edited by the external device and the edition parameter related to the edition processing by the external device is added as metadata.

(9)
The imaging device according to (8), in which
the signature processing unit acquires the edited image data and the re-signature data using metadata.

(10)
The imaging device according to (9), in which
the signature processing unit acquires the edited image data and the re-signature data using the metadata including the edition parameter.

(11)
The imaging device according to (9), further including:
an integration processing unit configured to integrate the re-signature data acquired by the signature processing unit with the edited image data and the metadata.

(12)
The imaging device according to (11), in which
the integration processing unit integrates the re-signature data acquired by the signature processing unit with the edited image data and the metadata including the edition parameter.

(13)
The imaging device according to any one of (1) to (12), in which
the determination processing unit executes the determination processing using information regarding the own device included in metadata.

(14)
The imaging device according to (3), in which the signature processing unit calculates a hash value using image data input from outside of the own device and metadata corresponding to the image data and generates the re-signature data using the calculated hash value.

(15)
The imaging device according to (2), in which
the signature processing unit generates the signature data using the image data captured by the own device and the metadata corresponding to the image data.

(16)
The imaging device according to (15), in which
the signature processing unit calculates a hash value using image data captured by the own device and metadata corresponding to the image data and generates the signature data using the calculated hash value.

(17)
The imaging device according to (14), in which
the re-signature data is generated using the hash value and a secret key in a public key encryption system.

(18)

The imaging device according to (11), further including:
a communication unit configured to output file data in which the re-signature data, the edited image data, and metadata are integrated.

(19)

An image data processing method executed by an imaging device including:
executing determination processing for determining whether or not image data is an own device captured image captured by an own device on the basis of metadata corresponding to the image data input from outside of the own device; and
acquiring re-signature data different from signature data at the time of imaging using the image data and metadata for the image data determined as an own device captured image in the determination processing.

(20)

A program for causing an imaging device to execute:
determination processing for determining whether or not image data is an own device captured image captured by an own device on the basis of metadata corresponding to the image data input from outside of the own device; and
signature processing for acquiring re-signature data different from signature data at the time of imaging using the image data and metadata for the image data determined as an own device captured image in the determination processing.

REFERENCE SIGNS LIST

1 Imaging device
20 Camera control unit
25 Signature processing unit
26 Integration processing unit
27 Recording control unit
28 Determination processing unit
29 Image processing unit
30A, 30B, 30C, 30D Image file
31 Image data
31a Edited image data
32 Pre-edit additional data
33 Signature data
34 Edition parameter
35 Re-signature data
70 Editing device
71 CPU

The invention claimed is:

1. An imaging device comprising:
a memory storing image data; and
a camera control circuitry configured to:
receive external metadata associated with the image data, the external metadata being external to the imaging device,
determine whether the image data was captured by the imaging device on a basis of the external metadata, and
responsive to determining that the image data was captured by the imaging device, acquire re-signature data using the image data and the external metadata, the re-signature data being different from signature data at a time the imaging device captured the image data.

2. The imaging device according to claim 1, wherein the camera control circuitry is further configured receive the image data from an external device, the external device being external to the imaging device, in which an edition parameter related to edition processing by the external device is included in the external metadata.

3. The imaging device according to claim 1, wherein the camera control circuitry is further configured to determine whether the image data was captured by the imaging device using information regarding the imaging device included in the external metadata.

4. The imaging device according to claim 1, wherein in a case where the image data is not edited by an external device and an edition parameter related to edition processing by the external device is added to the external metadata,
the camera control circuitry is further configured to acquire the image data and the re-signature data using the external metadata.

5. The imaging device according to claim 4, wherein the camera control circuitry is further configured to integrate the re-signature data with the image data and the external metadata including the edition parameter.

6. The imaging device according to claim 1, wherein the camera control circuitry is further configured to acquire the image data captured by the imaging device and the signature data using the external metadata.

7. The imaging device according to claim 6, wherein the camera control circuitry is further configured to generate the signature data using the image data and the external metadata.

8. The imaging device according to claim 7, wherein the camera control circuitry is further configured to:
calculate a hash value using the image data and the external metadata, and
generate the signature data using the hash value that is calculated.

9. The imaging device according to claim 1, wherein the camera control circuitry is further configured to generate the re-signature data using the image data and the external metadata.

10. The imaging device according to claim 2, wherein the camera control circuitry is further configured to:
calculate a hash value using the image data and the external metadata, and
generate the re-signature data using the hash value that is calculated.

11. The imaging device according to claim 10, wherein the re-signature data is generated by the camera control circuitry using the hash value and a secret key in a public key encryption system.

12. The imaging device according to claim 1, wherein the camera control circuitry is further configured to generate edited image data by executing image processing on the image data using an edition parameter, and
the image data is not edited by an external device and the edition parameter related to edition processing by the external device is added to the external metadata.

13. The imaging device according to claim 12, wherein the camera control circuitry is further configured to acquire the edited image data and the re-signature data using the external metadata.

14. The imaging device according to claim 13, wherein the camera control circuitry is further configured to integrate the re-signature data with the edited image data and the external metadata.

15. The imaging device according to claim 14, further comprising:
the camera control circuitry is further configured to output file data in which the re-signature data, the edited image data, and the external metadata are integrated.

16. An image data processing method comprising:
determining, with a camera control circuitry, whether image data was captured by an imaging device on a basis of external metadata associated with the image data, the external metadata being external to the imaging device; and
responsive to determining that the image data was captured by the imaging device, acquiring, with the camera control circuitry, re-signature data using the image data and the external metadata, the re-signature data being different from signature data at a time of the imaging device capturing the image data.

17. A non-transitory computer-readable medium comprising a program that when executed by an electronic processor, causes the electronic processor to perform a set of operations comprising:
determining whether image data was captured by an imaging device on a basis of external metadata associated with the image data, the external metadata being external to the imaging device; and
acquiring re-signature data using the image data and the external metadata, the re-signature data being different from signature data at a time of the imaging device capturing the image data.

18. The image data processing method according to claim 16, further comprising:
acquiring the image data captured by the imaging device and the signature data using the external metadata.

19. The image data processing method according to claim 16, further comprising:
generating the re-signature data using the image data and the external metadata.

20. The image data processing method according to claim 16, further comprising:
receiving the image data from an external device, the external device being external to the imaging device, in which an edition parameter related to edition processing by the external device is included in the external metadata.

* * * * *